United States Patent
Nickel

(10) Patent No.: US 7,171,942 B2
(45) Date of Patent: Feb. 6, 2007

(54) PROTECTIVE ENGINE SPEED CONTROL FOR A CENTRIFUGAL CLUTCH

(75) Inventor: Hans Nickel, Weissach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 11/163,364

(22) Filed: Oct. 17, 2005

(65) Prior Publication Data

US 2006/0086337 A1 Apr. 27, 2006

(30) Foreign Application Priority Data

Oct. 21, 2004 (DE) ............ 10 2004 051 259

(51) Int. Cl.
*F02D 31/00* (2006.01)
*F00P 5/00* (2006.01)
*B60W 10/08* (2006.01)

(52) U.S. Cl. ............ 123/335; 123/350; 123/406.59; 477/181

(58) Field of Classification Search ........ 123/330–335, 123/349, 350, 406.23, 406.45, 406.59, 198 D, 123/198 DC; 30/381; 192/41 R, 89.1, 105 A; 477/107, 175, 181
See application file for complete search history.

(56) References Cited

U.S. PATENT DOCUMENTS

| | | | | |
|---|---|---|---|---|
| 4,106,605 A | * | 8/1978 | Winchell | 192/89.22 |
| 4,336,778 A | * | 6/1982 | Howard | 123/334 |
| 4,630,590 A | * | 12/1986 | Kondo et al. | 123/406.75 |
| 4,662,071 A | * | 5/1987 | Hoppner et al. | 30/381 |
| 4,696,150 A | * | 9/1987 | Geeck, III | 477/170 |
| 7,048,670 B2 | * | 5/2006 | Isoda et al. | 477/107 |

FOREIGN PATENT DOCUMENTS

JP          61192935 A   *   8/1986   ............ 192/89.1

* cited by examiner

*Primary Examiner*—Willis R. Wolfe, Jr.
(74) *Attorney, Agent, or Firm*—Gudrun E. Huckett

(57) ABSTRACT

A device that controls the engine speed of an internal combustion engine of a hand-held power tool has a protective control unit. The engine has an ignition control unit for controlling the ignition timing relative to a crank angle of a crankshaft based on the crankshaft speed and also has a centrifugal clutch driven by the crankshaft that begins to engage when a first engine speed is surpassed and is fully engaged when a second engine speed is reached. The protective control unit is activated within an engine speed range between the first and second engine speeds and monitors a dwell time of the actual engine speed within the engine speed range. When a predetermined dwell time of the actual engine speed is surpassed, the protective control unit intervenes in the combustion process and corrects the engine speed to a value that is outside of the engine speed range.

13 Claims, 1 Drawing Sheet

PROTECTIVE ENGINE SPEED CONTROL FOR A CENTRIFUGAL CLUTCH

BACKGROUND OF THE INVENTION

The invention relates to a control device for controlling the engine speed of an internal combustion engine, in particular, of a two-stroke engine of a hand-held power tool such as a motor chainsaw, a cut-off device, a trimmer and the like. The internal combustion engine comprises an ignition control unit that controls the ignition timing of the spark plug relative to the crank angle of the crankshaft of the internal combustion engine as a function of the speed of the crankshaft. The engine further comprises a centrifugal clutch driven by the crankshaft that begins to engage when a first engine speed is surpassed and that is fully engaged when a second engine speed is reached.

Portable, hand-held power tools, for example, motor chainsaws, cut-off devices, trimmers and the like, are usually driven by a two-stroke engine whose spark plug is connected to an ignition control unit that controls the ignition timing relative to the crank angle of the internal combustion engine as a function of the speed of the crankshaft. A support for the flyweights of a centrifugal clutch is fixedly secured on the crankshaft, and the clutch bell of the centrifugal clutch is connected to an output shaft, an output gear or an output pulley or the like. When surpassing an engaging speed (first engine speed), the centrifugal clutch begins to engage and, after reaching a higher speed (second engine speed), it is essentially fully engaged without slip. When passing through this engine speed range, there is slip between the support with the flyweights and the clutch bell so that heat is generated. When the centrifugal clutch is operated with slip over an extended period of time in the range between the engaging speed and the fully engaged speed because of impermissible operating states, thermal overloads can occur that lead to impairment of the proper function of the centrifugal clutch.

SUMMARY OF THE INVENTION

It is an object of the present invention to limit the thermal load of a centrifugal clutch.

In accordance with the present invention, this is achieved in that a protective control unit is activated within the engine speed range between the first engine speed and the second engine speed, in that the protective control unit monitors the dwell time of the actual speed within the engine speed range, and in that the protective control unit upon surpassing a predetermined or specified dwell time intervenes in the control of the combustion process in such a way that the engine speed is corrected to a value outside of the engine speed range.

In the engine speed range between the first engine speed (engaging speed) and the second engine speed (fully engaged speed), a protective control unit is activated that monitors the dwell time of the actual speed within the engine speed range. When the predetermined dwell time of the actual speed within the engine speed range is surpassed, intervention in the combustion process is effected, for example, by changing the ignition timing or the fuel supply, such that the engine speed is corrected to be outside of the engine speed range. In this way, the dwell time of the actual speed within the critical engine speed range between the first engine speed and the second engine speed is limited so that the possible heat development caused by slip between the support of the centrifugal clutch and the clutch bell is limited also. Thermal overload of the clutch can be safely prevented in this way.

As a further advantage, a safe separation between the output shaft and the combustion engine is achieved because a safe clutch disengagement during idling of the internal combustion engine is monitored and is thus ensured by means of the protective control unit according to the present invention.

Advantageously, after it has been determined that the dwell time within the engine speed range is too long, the engine speed is lowered to a value below the first engine speed, i.e., the engaging speed. In this connection, it is advantageous to lower the engine speed to a value below the engaging speed which value includes a safety margin relative to the engaging speed.

The intervention in the combustion can be carried out in such a way that the ignition of the spark plug is completely suppressed or suppressed in accordance with a preset pattern. In particular, stochastic patterns can be expedient. When fuel is supplied to the combustion engine by a switchable valve, for example, a solenoid valve, the fuel supply can be changed or switched off by closing the valve for one or several crankshaft revolutions; this can be done in addition to the measure of suppressing ignition or instead of suppressing ignition.

The device comprises expediently a timing element for measuring the dwell time, in particular, a timing element that is a counter. Expediently, the revolutions of the crankshaft are added and, when a value that can be preselected is reached, intervention in the ignition control is carried out so as to lower the engine speed.

The deactivation of the protective control unit, i.e., the deactivation of ignition intervention, can be realized by means of dropping below a deactivation engine speed wherein the deactivation engine speed should be significantly below the engaging speed. When dropping below the deactivation engine speed, the intervention in the combustion process is deactivated so that the motor will run up again. When the engine speed is again within the monitored engine speed range for too long a period of time, intervention by lowering the engine speed is performed again. The thus resulting non-uniform abnormal running of the engine provides also an acoustic warning signal for the operator indicating that the operational state is impermissible.

The arrangement of a sensor or switch on the throttle valve is expedient; by means of the sensor or switch, the idle position of the throttle valve can be detected and this information can be sent to the protective control unit. When this signal is received, the protective control unit is deactivated and engine operation is reverted to normal ignition control.

DESCRIPTION OF THE PREFERRED EMBODIMENTS

Figure 1:
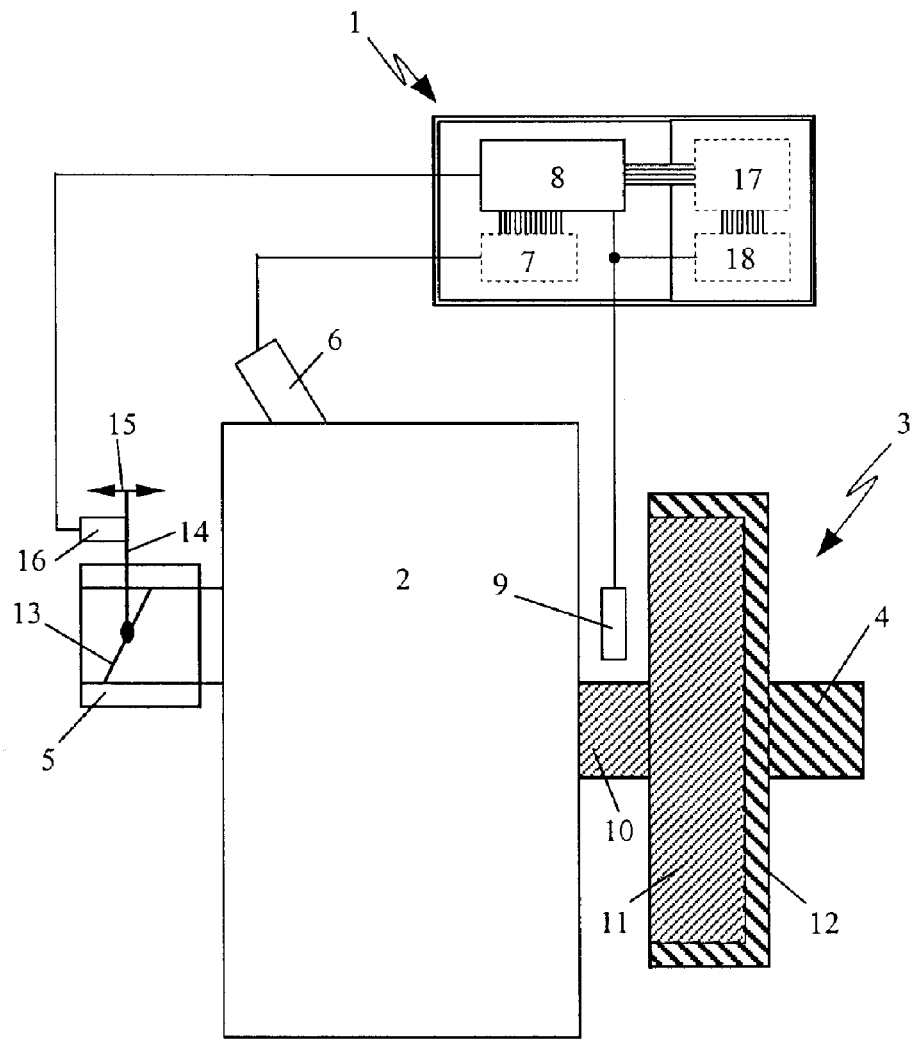
FIG. 1 is a schematic view of a control device according to the invention for controlling the engine speed of an internal combustion engine for protecting a centrifugal clutch.

The control device 1 illustrated in FIG. 1 for controlling the engine speed of an internal combustion engine 2 is employed for an output shaft 4 that is operated by a centrifugal clutch 3. Such drives are used in motor chainsaws, cut-off devices, trimmers, blowers and similar portable, hand-held working tools (power tools). The internal combustion engine 2 is in particular a two-stroke engine.

The internal combustion engine 2—a single cylinder engine in the illustrated embodiment—takes in a fuel/air mixture through the carburetor 5. The mixture that flows into the combustion chamber (not illustrated) of the internal combustion engine 2 is compressed and then ignited by a spark plug 6 that is controlled by an ignition control unit 7. The ignition control unit 7 is monitored by a central processing unit (CPU) 8 that evaluates inter alia the speed signal of an engine speed sensor 9 and determines the position of the crankshaft 10 by means of the engine speed sensor 9. In case of a flywheel magneto ignition, the engine speed information is derived from the induced voltage signal.

When the engine idles at approximately 2,500 to 3,500 revolutions, the centrifugal clutch 3 is disengaged. The flyweight elements are movably arranged on a support 11 mounted on the crankshaft while the output shaft 4 is connected to the clutch bell 12 surrounding the support 11. The configuration of such a centrifugal clutch is well known to a person skilled in the art and is therefore not discussed in detail in this context.

The speed of the internal combustion engine 2 is controlled by the operator by pivoting a throttle valve 13 arranged in the carburetor 5 for which purpose the throttle valve 13 is connected to a lever, preferably a throttle lever 14, that can be pivoted in the direction of double arrow 15 for opening and closing the throttle valve 13.

The position of the throttle lever 14 is monitored by a position sensor or switch 16 whose signal is supplied to the central processing unit 8 so that the latter can detect the open position of the throttle valve 13 adjusted by the operator. In the illustrated embodiment, the position sensor 16 is embodied as an idle sensor that communicates the idle position of the throttle valve 13 to the CPU 8.

The ignition timing of the spark plug 6 is controlled by the central processing unit 8 by means of the ignition control unit 7 as a function of the speed of the crankshaft 10 relative to the crank angle. In this way, on the one hand, a safe idle speed can be achieved and, on the other hand, a powerful running up of the engine to highest speed is ensured. The central processing unit 8 intervenes via the ignition control unit 7 so as to lower the engine speed, for example, when the maximum engine speed has been reached.

Figure 2:
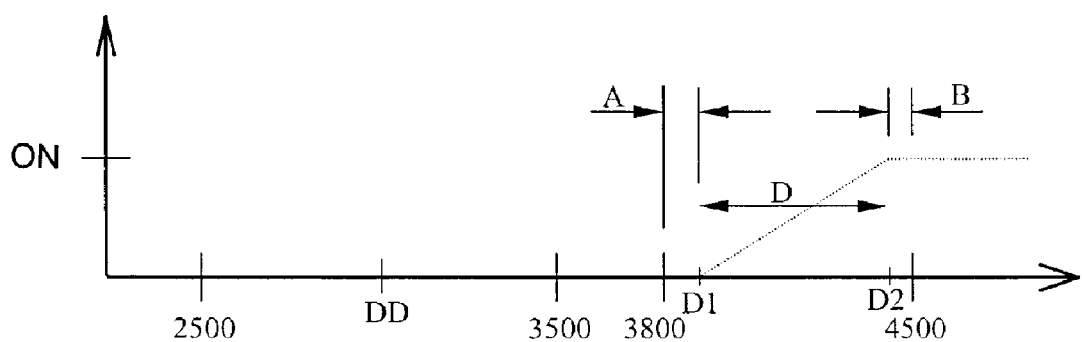
FIG. 2 is a schematic illustration of the operation of the control device according to FIG. 1, illustrated as a function of the engine speed.

In the range of idle speed, for example, 3,500 rpm, the centrifugal clutch 3 is disengaged as illustrated in the diagram of FIG. 2. Above an engaging speed D1, for example, 3,900 rpm, the flyweights of the support 11 contact the clutch bell 12 and begin to transmit torque as indicated by the dotted line in FIG. 2. The centrifugal clutch 3 provides a torque-transmitting connection wherein the slip between the support 11 and the clutch bell 12 is reduced with increasing speed. Above a second engine speed D2, for example, 4,400 rpm, the centrifugal clutch 3 is essentially fully engaged without slip ("ON").

As illustrated in FIG. 1, a protective control unit 17 is provided that is preferably integrated into the control device 1. It monitors in particular the dwell time of the engine speed within the engine speed range D between the engaging speed D1 and the second engine speed D2. For example, the protective control unit 17 is activated by the central processing unit 8 when the engine speed is within the engine speed range D that comprises the first engine speed D1 (engaging speed) and the second engine speed D2 (fully engaged speed).

Any time when the central processing unit 8 activates the protective control unit 17, the protective control unit 17 monitors the dwell time of the actual engine speed within the engine speed range D. When a predetermined dwell time of the actual engine speed within the engine speed range D is determined, the central processing unit 8 receives an appropriate signal from the protective control unit 17 so that the central processing unit 8 intervenes in the control of the ignition timing of the spark plug 6 in such a way that the engine speed drops and is corrected to a value that is outside of the engine speed range D. The engine speed is lowered to a value below the engaging speed D1; a safety margin A relative to the engaging speed D1 is provided.

In the same way, a safety margin B is maintained relative to the second engine speed at which the centrifugal clutch 3 will fully engage without slipping. The engine speed range D that is monitored by the protective control unit 17 extends thus from below the engaging speed D1 to above the fully engaged speed D2.

At any time when the protective control unit 17 detects too long a dwell time of the actual engine speed within the engine speed range D, intervention in the ignition is effected in such a way that the engine speed is lowered to a value below the engaging speed D1. In the embodiment according to FIG. 2, the lower threshold is the engaging speed D1 minus the safety margin A, i.e., an engine speed of approximately 3,800 rpm.

The intervention of the central processing unit 8 in the operation of the ignition control unit 7 can be realized in accordance with a predetermined, fixed or variable pattern. Expediently, the ignition is suppressed in accordance with such a pattern; such a pattern can be in particular a stochastic pattern. Advantageously, the ignition can also be suppressed until a predetermined limit value of the engine speed has been reached.

In order to measure the dwell time of the actual engine speed within the engine speed range D, a timing element 18 can be provided. This timing element can be a counter that adds up the revolutions of the crankshaft and initiates the imprinted engine speed drop when a predetermined or specified value is reached.

The activation and deactivation of the protective control unit 17 can be realized by dropping below the deactivation speed DD that is significantly below the first engine speed D1 minus the safety margin A. As an alternative, the protective control unit 17 can be deactivated in the idle position of the throttle valve 13; for this purpose, the position sensor 16 is provided.

At any time when the operator does not return the throttle lever 14 completely into the idle position of the throttle valve 13, i.e., does not release completely the throttle lever, there is the risk that the engine speed of the internal combustion engine 2 is within the engine speed range D of the centrifugal clutch 3. Since such a state can be present also during any acceleration process, the dwell time within a predetermined engine speed range D is measured by the protective control unit and the engine speed is lowered by intervening in the ignition control any time the measured dwell time becomes too long. Only when the operator releases the throttle lever 14 and a proper idle position of the throttle valve 13 has been detected, the ignition is returned to normal operation. This can occur also after dropping below the deactivation speed DD.

While specific embodiments of the invention have been shown and described in detail to illustrate the inventive principles, it will be understood that the invention may be embodied otherwise without departing from such principles.

What is claimed is:

1. A control device for controlling an engine speed of an internal combustion engine of a hand-held power tool, wherein the internal combustion engine comprises an ignition control unit for controlling an ignition timing of a spark plug relative to a crank angle of a crankshaft of the internal combustion engine based on a speed of the crankshaft, wherein the internal combustion engine has a centrifugal clutch driven by the crankshaft, wherein the centrifugal clutch begins to engage when a first engine speed is surpassed and is fully engaged when a second engine speed is reached, the control device comprising:

a protective control unit that is activated within an engine speed range between the first engine speed and the second engine speed;

wherein the protective control unit monitors a dwell time of an actual engine speed within the engine speed range; and wherein, when a predetermined dwell time of the actual engine speed is surpassed, the protective control unit intervenes in a combustion process of the internal combustion engine such that the engine speed is corrected to a value that is outside of the engine speed range.

2. The control device according to claim 1, wherein the protective control unit intervenes by changing a fuel supply.

3. The control device according to claim 1, wherein the protective control unit intervenes by changing the ignition timing.

4. The control device according to claim 1, wherein the protective control unit intervenes such that the actual engine speed drops below the first engine speed.

5. The control device according to claim 1, wherein the protective control unit comprises a timing element for measuring the dwell time.

6. The control device according to claim 1, comprising a switch that is in a closed position when a throttle valve of the internal combustion engine is in idle position, wherein the switch deactivates the protective control unit when the switch is in the closed position.

7. The control device according to claim 1, wherein the protective control unit comprises a counter for measuring the dwell time.

8. The control device according to claim 7, wherein the counter counts and adds revolutions of the crankshaft.

9. The control device according to claim 1, wherein the protective control unit is deactivated when the engine speed drops below a deactivation engine speed.

10. The control device according to claim 9, wherein the deactivation engine speed is below the first engine speed.

11. The control device according to claim 1, wherein the protective control unit intervenes by suppressing ignition.

12. The control device according to claim 11, wherein the protective control unit employs a preset pattern for suppressing ignition.

13. The control device according to claim 12, wherein the protective control unit employs a stochastic pattern for suppressing ignition.

\* \* \* \* \*